(12) United States Patent
Bücker et al.

(10) Patent No.: US 8,683,202 B2
(45) Date of Patent: Mar. 25, 2014

(54) METHOD FOR VERIFYING THE AUTHENTICITY OF MESSAGES EXCHANGED ACCORDING TO A MOBILE INTERNET PROTOCOL

(75) Inventors: Wolfgang Bücker, Neubiberg (DE); Wolfgang Gröting, Oberhausen (DE); Joachim Kroβ, München (DE)

(73) Assignee: Siemens Aktiengesellschaft, Munich (DE)

( * ) Notice: Subject to any disclaimer, the term of this patent is extended or adjusted under 35 U.S.C. 154(b) by 943 days.

(21) Appl. No.: 12/223,797

(22) PCT Filed: Jan. 31, 2007

(86) PCT No.: PCT/EP2007/050936
§ 371 (c)(1),
(2), (4) Date: Aug. 8, 2008

(87) PCT Pub. No.: WO2007/090774
PCT Pub. Date: Aug. 16, 2007

(65) Prior Publication Data
US 2010/0161986 A1   Jun. 24, 2010

(30) Foreign Application Priority Data
Feb. 9, 2006  (DE) .......................... 10 2006 006 072

(51) Int. Cl.
*H04L 29/06* (2006.01)
*H04W 12/00* (2009.01)

(52) U.S. Cl.
USPC .......................................... 713/168; 380/247

(58) Field of Classification Search
None
See application file for complete search history.

(56) References Cited

U.S. PATENT DOCUMENTS

| | | | |
|---|---|---|---|
| 6,185,682 B1 | 2/2001 | Tang | |
| 6,760,444 B1 | 7/2004 | Leung | |
| 7,660,772 B2 | 2/2010 | Verkama | |
| 2001/0005840 A1 | 6/2001 | Verkama | |
| 2004/0029584 A1* | 2/2004 | Le et al. ..................... | 455/432.1 |
| 2004/0234075 A1* | 11/2004 | Leung ......................... | 380/270 |

FOREIGN PATENT DOCUMENTS

| | | |
|---|---|---|
| EP | 1 414 212 A1 | 4/2004 |
| JP | 2000-516734 | 12/2000 |
| JP | 2002-520708 | 7/2002 |
| JP | 2004-40555 | 2/2004 |
| WO | 00 02407 | 1/2000 |
| WO | 03/014935 A1 | 2/2003 |
| WO | 2005/036813 A1 | 4/2005 |

OTHER PUBLICATIONS

C. Perkins, "IP Mobility Support"; Network Working Group, Request for Comments 2002; Oct. 1996; pp. 1-70.
C. Perkins, "IP Mobility Support for IPv4"; Network Working Group, Request for Comments: 3344; Aug. 2002; pp. 1-99.

(Continued)

*Primary Examiner* — Gilberto Barron, Jr.
*Assistant Examiner* — Izunna Okeke
(74) *Attorney, Agent, or Firm* — Staas & Halsey LLP (57) ABSTRACT

Messages exchanged between a mobile node and a home agent according to a mobile Internet protocol are authenticated using cryptographic methods applied to the messages and which have been agreed on between the mobile node and the home agent.

15 Claims, 3 Drawing Sheets

(56) References Cited

OTHER PUBLICATIONS

J. Arkko, et al.; Security Mechanism Agreement for the Session Initiation Protocol (SIP); Network Working Group, Request for Comments: 3329; Jan. 2003; pp. 1-24.

C. Perkins et al.; "Authentication, Authorization, and Accounting (AAA), Registration Keys for Mobile IPv4"; Network Working Group, Request for Comments: 3957; Mar. 2005; pp. 1-27.

P. Calhoun, et al.; "Diameter Mobile IPv4 Application"; Network Working Group, Request for Comments: 4004, Aug. 2005; pp. 1-53.

TIA Building Global Communication, "Project No. 3-0238", Informational Copy, Dec. 14, 2005, pp. 1-55.

International Search Report for Application No. PCT/EP2007/050936; mailed Jun. 29, 2007.

German translation of Japanese Office Action for Application No. 2008-553725 mailed Apr. 28, 2011.

Chinese Office Action issued May 6, 2011 in Chinese Patent Application No. 200780005037 (8 pages) (German translation 13 pages) (partial English translation 4 pages).

\* cited by examiner

REGISTRATION REQUEST FIELDS

FIG. 2

METHOD FOR VERIFYING THE AUTHENTICITY OF MESSAGES EXCHANGED ACCORDING TO A MOBILE INTERNET PROTOCOL

CROSS REFERENCE TO RELATED APPLICATIONS

This application is based on and hereby claims priority to German Application No. 10 2006 006 072.5 filed on Feb. 9, 2006, the contents of which are hereby incorporated by reference.

BACKGROUND

Described below is a method for verifying the authenticity of messages which are exchanged between a mobile node and a home agent according to a mobile Internet Protocol. Internet protocol IPv4 was developed for wired communication with fixed-location computers and switching nodes. To allow devices such as laptops and PDAs (Personal Digital Assistants) to switch from one computer network into another for example and in doing so to retain a fixed IP address, the network protocol "IP mobility Support for IPv4", abbreviated to "Mobile-IP" was drafted by the "Internet Engineering Task Force" (IETF). Mobile-IP is described in the "Request For Comments" (RFC) 3344 and applies as a standard for Internet connections with mobile subscribers.

In Mobile-IP a mobile node refers to a computer or router which changes its access from one network to another network. Home agents are routers which are connected in the home network of the mobile node and which administer the location information of the mobile node. A foreign agent is a router which provides the routing services to the foreign network for the mobile node and takes over the forwarding of data packets from the home agent to the mobile agent.

If a mobile node discovers that it has been connected to a foreign network it requests a care-of address in the foreign network. The care-of address is determined from the advertisement of the foreign agent (foreign agent care-of address) or via DHCP (co-located care-of address). The mobile node registers with its home agent using the new care-of address. The data packets arriving at the home agent are then sent on to the mobile host by IP-to-IP encapsulation. After its return to the home network the mobile node establishes contact with its home network and registers itself there.

When a foreign agent is used the following operations are necessary for registration: The mobile node transfers a registration request with the address of its home agent to the foreign agent. The latter forwards the registration request to the home agent. Thereafter the home agent sends a registration reply to the foreign agent which either accepts or rejects the registration. Finally the foreign agent transfers the registration reply to the mobile node. Without a foreign agent only two steps are required for registration: First the mobile node sends a registration request to the home agent. Subsequently the home agent replies with a registration reply to the mobile node.

Since the mobile node notifies the home agent in the registration request of its current care-of address, i.e. the address under which it is to be reached in the foreign network, this address must be protected against manipulation. If for example an attacker were to modify the care-of address in a registration request the home agent no longer sends all data packets to the mobile node, but to the address specified by the attacker. The authenticity of the registration messages must be guaranteed, their contents may not be changed nor may their sender be falsified.

To protect the authenticity so-called Mobility Security Associations (MSA) are provided between the two communication partners. The communication partners are mostly the home agent and a mobile node, with mobility security associations also existing between foreign agent and home agents or between foreign agent and mobile node. A number of different mobility security associations can exist between the communication partners in each direction, with in practice only a single mobility security association being used for both directions. Mobility Security Associations MSA are collections of security relationships between the communication partners and specify which cryptographic method and which key are to be used for protecting the authenticity. The individual security relationships of a mobility security association are identified by a "Security Parameter Index" (SPI).

The cryptographic methods of the security relationships include an authentication algorithm and a replay protection style in each case.

HMAC-MD5 is provided as the standard authentication algorithm, which calculates on the basis of the MD5 algorithm a "Message Authentication Code" (MAC), meaning a hash value with a secret key covering the message to be protected. If the message is modified or another key is used, the Message Authentication Code MAC changes when it is calculated again and manipulations or sender falsifications can be rejected. As well as HMAC-MD5 other authentication algorithms can also be used.

Replay protection is used for protection against old registration requests being replayed. With replay protection with time stamps the time of day is inserted into the message by the sender and a check is made by the recipient that the message is not older than a prespecified time. With replay protection with nonces (number used only once) a new random number is inserted into each message to the recipient from the sender. The sender then checks whether the recipient inserts the same number into its next message to the sender. Other replay protection styles can also be used. The time stamps and nonces or the values created by other replay protection styles are entered by the sender into an identification field of the registration messages and checked by the recipient.

To be able to authenticate a message, Mobile-IPv4 makes provision for the sender to append an authentication extension to the message which includes the Security Parameters Index SPI and the Message Authentication Code MAC covering the part of the message to be protected. An authentication extension between mobile node and home agent is referred to as the "Mobile Home Authentication Extension" (MHAE). The recipient checks the authenticity by accessing the Mobility Security Association MSA identified by the Security Parameters Index SPI and from it determines the authentication algorithm and replay protection style to be used. To do so the recipient computes the Message Authentication Code MAC and verifies that the received result matches the Message Authentication Code MAC in the received message. To protect against replays of old messages, the replay protection style values in the identification field of the registration messages are also checked.

Since different authentication algorithms and replay protections styles can be used with Mobile-IP, the communication partners must agree about the authentication algorithm and replay protection style to be used.

One option for doing this involves defining the authentication algorithm and replay protection style to be used beforehand and configuring the mobile node and the home agent accordingly. However this procedure has the following disadvantages: In a large network with many mobile nodes and a number of home agents manual configuration of all communication partners is very time consuming. This applies both to the initial configuration and also to the case in which weaknesses are discovered in the configured cryptographic method and this has to be replaced in all communication partners. Furthermore it is not possible, if the cryptographic methods supported by the mobile node or the home agent are unknown, e.g., for roaming in 3GPP (Third Generation Partnership Project) WLANs (Wireless Local Area Networks), to determine the supported cryptographic methods of the two communication partners within a short period, to define a suitable shared authentication algorithm and replay protection style and to configure the two communication partners accordingly.

An improvement to overcome these disadvantages involves the network selecting the cryptographic method to be used by the communication partners. In RFC 3957 "Authentication, Authorization and Accounting (AAA) Registration Keys for Mobile IPv4" the Mobility Security Associations MSA between the mobile node and its home agent or the Foreign Agent are derived from the "AAA Security Association" between the mobile node and its Home AAA Server. The authentication algorithm and replay protection style are transmitted in a "Key Generation Extension" of the registration message from the AAA server to the mobile node and the home agent. A similar method with a Diameter AAA servers is described in the RFC 4004 "Diameter Mobile IPv4 Application". The method allows the network to determine the cryptographic method. The disadvantage however is that in generally it is not known to the network which authentication algorithms and replay protection styles are supported by the mobile node. Thus for example an older mobile node which does not support the newest cryptographic method prescribed by the network cannot communicate with the latter although the mobile node perhaps supports an older method still accepted as secure by the network.

A further improvement of this situation involves not defining the cryptographic method on one side but negotiating it between the communication partners. A method is known from RFC 3329 "Security Mechanism Agreement for the Session Initiation Protocol (SIP)" in which a client sends a list of supported cryptographic methods to a server. The server then sends the client a challenge with a list of the cryptographic methods which it supports. The client selects from the common methods the method with the highest preference. To avoid an attacker modifying the list of and thus pretending for example that only cryptographically-weak methods are supported by the server and the communication partners subsequently agreeing on a corresponding weak method, the list must be transmitted once more protected. The client thus activates the selected cryptographic method and sends the server the list with the methods supported by the server. The server checks the authenticity of the list to insure that the original list has not been modified. A further negotiation mechanism is known from the "Internet Key Exchange" (IKE, IPsec-IKE). The disadvantage of this method is however that it cannot be used for mobile IP since the first message must be transferred unprotected but mobile IP demands an authentication protection right from the first message transmitted. A further disadvantage is that the list with the supported cryptographic methods has to be transmitted twice.

SUMMARY

Thus, described below is a method in which a mobile node and a home agent or a foreign agent inform each other about the mutually-supported cryptographic methods, a mutually-supported cryptographic method is selected and the authenticity of messages which are exchanged between the mobile node and home agent or foreign agent is verified in accordance with a mobile Internet Protocol.

The method includes verifying the authenticity of messages which are exchanged between a mobile node and a home agent in accordance with a Mobile Internet protocol, with the cryptographic methods used for verifying the authenticity of messages being agreed between the mobile node and the home agent.

The fact that the cryptographic method is not defined and configured in advance makes it possible to configure large networks with the widest variety of cryptographic methods supported by mobile nodes and home agents dynamically and efficiently. Furthermore the optimum cryptographic method can be selected in each case for each message security association, i.e. on the one hand the strongest cryptographic method supported by both communication partners can be used and on the other hand weaker cryptographic methods can be referred back to if a strong method is not supported by both communication partners. Furthermore the method allows compromised cryptographic methods to be replaced without any great effort.

In accordance with one development the mobile Internet Protocol is the mobile-IPv4 protocol.

In a further development the mobile node creates a registration request containing information about the cryptographic methods supported by the mobile node. The mobile node then verifies the authenticity of the registration request with the aid of a first cryptographic method. Subsequently the mobile node sends the verified registration request to the home agent and the home agent checks the authenticity of the registration request.

Unlike Mobile-IP in accordance with RFC 3344, the registration request created by the mobile node contains information about the cryptographic methods supported by the mobile node so that these can be made known to the home agent. Furthermore the authenticity of even the first registration request is verified as demanded by mobile IP so that it can also be established whether the information about the cryptographic methods supported by the mobile node has been falsified or whether the registration request is originating from another source.

In a development the home agent sends a registration reply to the mobile node in which the registration request is rejected if the home agent does not find the registration request to be authentic.

Should either of the contents of the registration request or the sender have been manipulated or should there be a replay, the home agent does not allow registration of the mobile node.

In a development, if the home node agent establishes the authenticity of the registration request, the home agent selects a further common cryptographic method supported by both the mobile node and the home agent and sends a registration reply to the mobile node in which it notifies the mobile node about the selection of the further mutually-supported cryptographic method.

The home agent can thus not only determine a cryptographic method, but if a number of such mutually-supported cryptographic methods are available, it can select a preferred method.

In a development the registration reply contains information about the cryptographic methods supported by a home agent.

With the aid of the information about the cryptographic methods supported by the home agent it is possible for the mobile node, if there is a renewed registration request, to use one of these methods as the first common cryptographic method used by both the mobile node and the home agent to verify the authenticity of the registration request.

In a development the home agent verifies the authenticity of the registration reply with the aid of a cryptographic method selected by it.

In this way the content and the sender of the registration reply is protected against manipulation so that an attacker cannot change the information about the supported cryptographic methods in their favor, by for example only specifying that cryptographically weak methods are supported.

In a development the mobile node checks the authenticity of the registration reply.

By checking the authenticity of the registration reply the mobile node can be sure that the cryptographic methods specified in the registration reply have not been manipulated or selected by a third party but are unchanged and originate from the home agent.

In a development the home agent registers the mobile node If the authenticity of the registration request could be established, with the registration reply of the home agent indicating the success of the registration and at least one message security association being set up between the mobile node and the home agent with the selected cryptographic method.

With the exchange of only two messages authenticated information about the supported cryptographic methods can be exchanged with the method, the optimum cryptographic method can be selected and corresponding message security associations established.

In a development the home agent selects as a further common cryptographic method the first cryptographic method, if the home agent cannot select a further mutually-supported cryptographic method between the home agent and the mobile node.

In a development the mobile node selects a further cryptographic method mutually supported by the mobile node and the home agent on the basis of the information in the registration reply and in this way sets up the at least one message security association between the mobile node and the home agent.

In a development the further cryptographic method mutually supported by the mobile node and the home agent is used by the latter to verify the authenticity of the further message exchange between the mobile node and the home agent.

The mutually-supported cryptographic method represents the method used in this case. On the one hand the choice can be made with a view to the cryptographic security of the method, on the other a cryptographically-weaker method can also be selected, but one which at least allows secure communication between the mobile node and the home agent.

In a development the first and the further cryptographic methods include Message Authentication Codes (MAC) and replay protection styles.

With the aid of the message authentication code it is ensured that the registration request or the registration reply and the information about the supported cryptographic methods contained therein has not been manipulated and that the identity, meaning the source and destination address, have not been changed. With the aid of the replay protection styles, which can be the time stamps or nonces for example, it is ensured that a registration reply is assigned to the associated registration request and a replay of old registration messages is avoided.

In a development the registration request and/or the registration reply are transmitted in clear text.

In this way it is possible for the home agent to read the cryptographic methods supported by the mobile node contained in the registration request and for the mobile node to obtain the methods supported by the home agent from the registration reply.

In a development the registration request and/or the registration reply contain information about the first cryptographic method.

Since the registration request or the registration reply are transmitted in clear text, by adding information about which first cryptographic method was used for securing authentication, the mobile node or the home agent can be informed about the authentication algorithm, replay protection style and key via which the authenticity of the message was verified and can be checked.

In a development the first cryptographic method is known from a previous data exchange between the mobile node and the home agent.

The first cryptographic method can be known from previous agreements or negotiations, such as registration requests and registration replies for example, or can be taken over by other home agents from the same network or by home agents which have similar or identical preferred algorithms and replay protection styles. In this way it is likely that the first registration request will not be rejected on account of an unknown authentication algorithm or replay protection style.

In a development the mobile node and the home agent have a shared secret key.

The secret key, which is included in the computation of the message authentication code on the basis of the authentication algorithm, ensures that this type of code can only be computed by the associated mobile node or the associated home agent.

In a development the method is executed with a mobile node and a foreign agent instead of with a mobile node and a home agent.

In a development the method is executed with a foreign agent and a home agent instead of with a mobile node and a home agent.

In this way the method also enables the authenticity of messages which are exchanged between a mobile node and a foreign agent or a foreign agent and the home agent to be verified.

BRIEF DESCRIPTION OF THE DRAWINGS

These and other aspects and advantages will become more apparent and more readily appreciated from the following description of an exemplary embodiment, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Figure 1A:
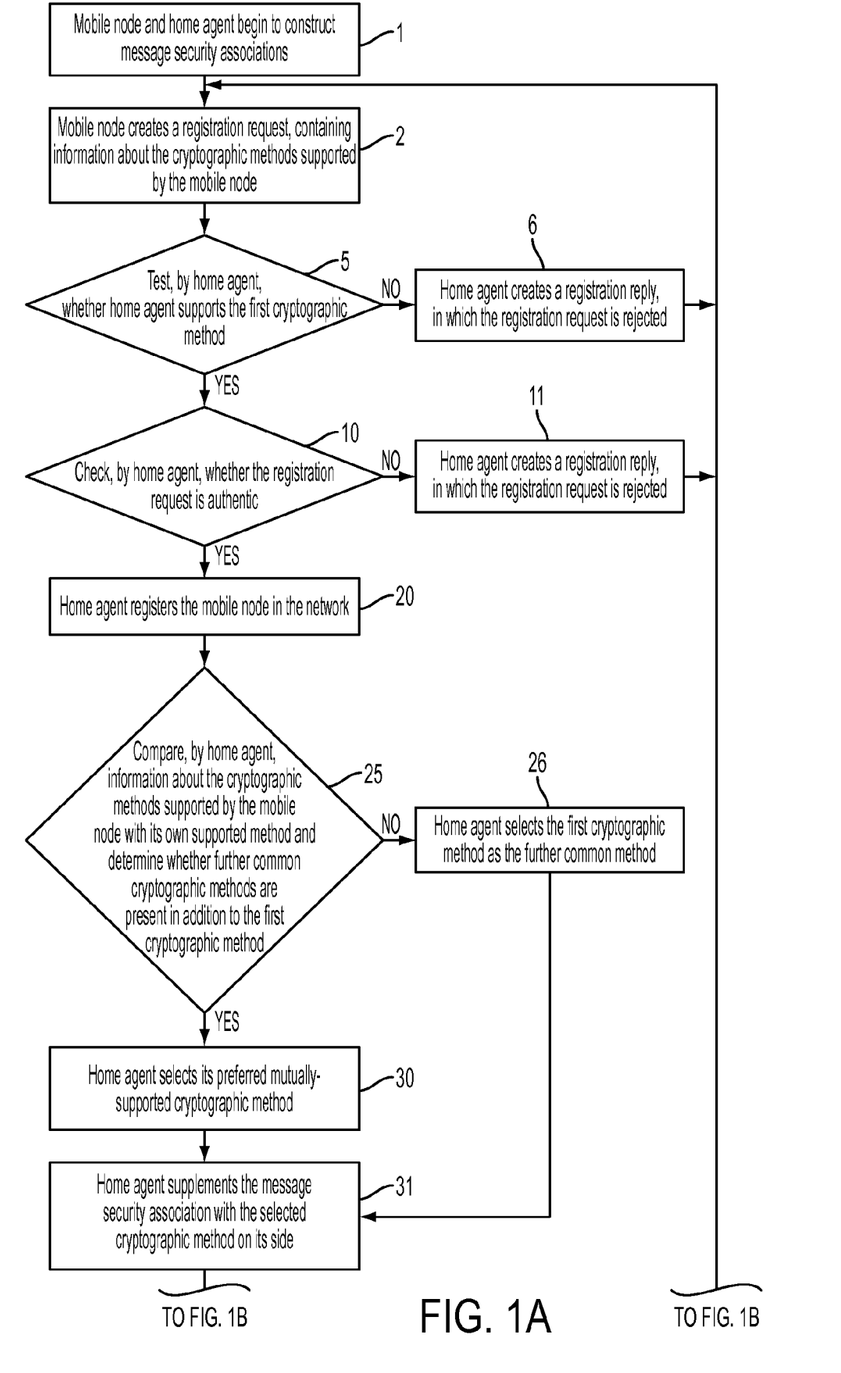
FIGS. 1A and 1B are a flowchart of an exemplary embodiment for agreement of cryptographic methods between a mobile node and a home agent.
Figure 1B:
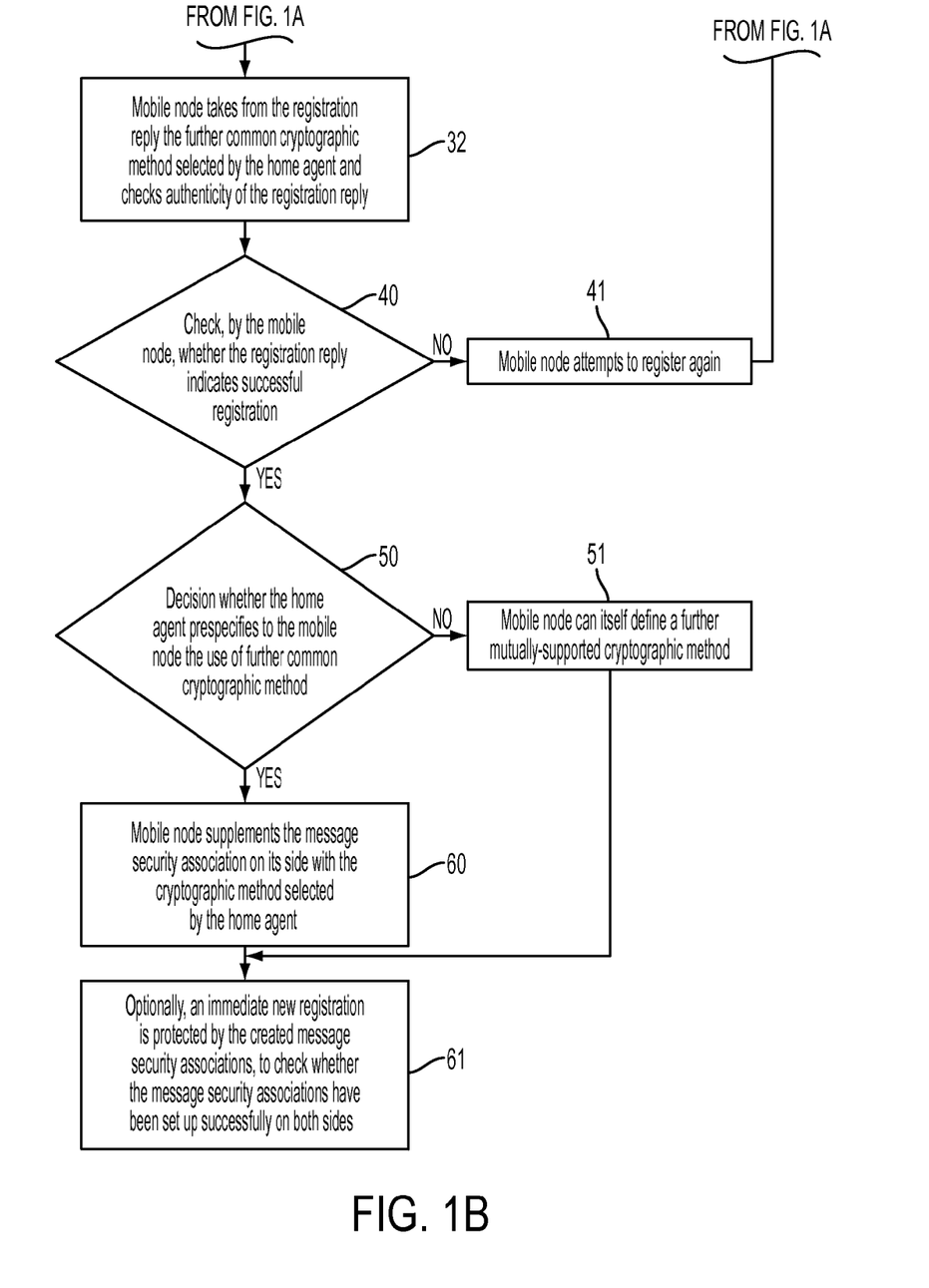

FIGS. 1A and 1B show a flow diagram of an exemplary embodiment for agreement of cryptographic methods for verifying the authenticity of messages which are exchanged between a mobile node and a home agent in accordance with Mobile-IPv4. The cryptographic method for verifying the authenticity uses an authentication algorithm and a replay protection style. The authentication algorithm is for example HMAC-MD5, in which a message authentication code is computed with an 128 bit long symmetrical key. The keys can for example be exchanged in accordance with RFC 3957 or, in the context of a 3GPP network, by a method based on a Generic Bootstrapping Architecture (GBA). Time stamps, as are prescribed in Mobile-IP, or nonces can be used as replay protection styles. Other methods for verifying the authenticity of the messages can naturally also be used.

The method can also be used to verify the authenticity of messages which are exchanged between a mobile node and a foreign agent or between a home agent and a foreign agent. In these cases it would be necessary to add the "Foreign Home Authentication Extension" (FHAE), or the "Mobile Foreign Authentication Extension" (MFAE), as prescribed by Mobile-IP, to the Foreign Mobile Authentication Extension FMAE. The method can also be employed in a context other than Mobile-IP, in order to negotiate cryptographic methods to verify the authenticity of messages. Individual steps of the flowchart can be relocated to other positions, expanded or omitted.

In step 1 the mobile node and the home agent begin to construct message security associations. Start with the assumption that all the information necessary for this, such as the secret key for example, is already present, and to complete the message security associations only the common cryptographic method, i.e. the authentication algorithm and the replay protection style, are required.

In step 2 the mobile node creates a registration request, containing information about the cryptographic methods supported by the mobile node. The mobile node also verifies the authenticity of the registration request with a first cryptographic method. This method is selected by the mobile node so that it is probable that it will be supported by the home agent. This can be done for example on the basis of information from previous negotiation with the home agent or with other home agents in the same network, which have similar or identical cryptographic methods. Since the authenticated registration request of the mobile node is sent as plain text to the home agent, it is possible to include a note in the registration request from which the home agent can discover which first cryptographic method was used for authentication.

In the interrogation of step 5 the home agent tests whether it supports the first cryptographic method. If this is not the case, the home agent cannot check the authenticity of the registration request. A critical security situation arises since an attacker could manipulate the information about the cryptographic methods supported by the mobile node to their advantage and/or the home agent cannot check the sender.

In step 6 the home agent thus creates a registration reply, in which the registration request is rejected. The rejection can in this case be an error message in accordance with Mobile-IP or a newly-defined error message. The registration reply is sent with a common authentication method mutually supported by the mobile node and the home agent and is sent from the home agent to the mobile node. The home agent can also send information in the registration reply about cryptographic methods that it supports, so that the mobile node, for a new registration request in step 2, can select from the list a new, first mutually-supported cryptographic method and can thereby protect a renewed registration request.

In the request in step 10 the home agent checks whether the registration request is authentic. This is possible since first cryptographic method selected by the mobile node is also supported by the home agent.

If the registration request is not authentic, this means that the registration request has been manipulated by an attacker for example. In this case the home agent creates in step 11 a registration reply, in which the registration request is rejected. The registration reply contains the Mobile-IP error messages provided for this case or a newly-defined error message and can also contain information about the cryptographic methods supported by the home agent. After the registration reply has been authenticated by the home agent with the first cryptographic method, this reply is sent to the mobile node, which in step 2 attempts to register it once again.

If the home agent has found the registration request to be authentic in step 20, the home agent registers the mobile node in the network.

In the interrogation of step 25 the home agent compares the information about the cryptographic methods supported by the mobile node with its own supported method and determines whether further common cryptographic methods are present in addition to the first cryptographic method. Thus it is possible for example to select as a first method a relatively weak, but widely-used method for protection of the registration request, in order to then check whether further cryptographically-strong methods are mutually supported by the mobile node and the home agent.

If the home agent cannot determine any further common cryptographic methods, the home agent selects in step 26 the first cryptographic method as the further common method.

If the home agent cannot detect any further mutually-supported cryptographic methods, in step 30 the home agent selects its preferred mutually-supported cryptographic method.

In step 31 the home agent supplements the message security association with the selected cryptographic method on its side. The home agent also creates a registration reply, containing information (a notification) about the method that it has selected, protects this with the selected further common method and sends the registration reply to the mobile node. If no other errors have occurred the registration reply also indicates that the registration was successful.

In step 32 the mobile node takes from the registration reply the further common cryptographic method selected by the home agent and thereby checks the authenticity of the registration reply.

In the interrogation of step 40 the mobile node checks whether the registration reply is indicating a successful registration.

If the registration was not successful the mobile node attempts to register again. In step 41 it can correct causes of errors which for example it obtains from the error code of the registration reply. If for example on agreement of the cryptographic method an error should have occurred, the mobile node can in the next registration request propose another list of cryptographic methods. A rejection can occur as a result of other errors not able to be influenced by a mobile node, such as a registration request delay time which is too long or too many mobile nodes already registered. In this case no corrections are required. The new registration attempt would begin again at step 2.

The interrogation in step 50 is reached if the registration reply indicates that the registration was successful. In interrogation 50 a decision is made as to whether the home agent prespecifies to the mobile node the use of the further common cryptographic method.

If the home agent does not allow the mobile node to use the further mutually-supported cryptographic method that it has selected, then in step 51 the mobile node can itself define a further mutually-supported cryptographic method. The mobile node then supplements the message security association on its side with the cryptographic method that it has selected. In this way it is possible for the home agent and the mobile node to use a different cryptographic methods to authenticate their messages, with the cryptographic methods selected by the two sides each having to be supported by the home agent and also by the mobile node.

If the home agent prescribes that the mobile node should use the further common cryptographic methods, in step 60 the mobile node supplements the message security association on its side with the cryptographic method selected by the home agent. In practice both home agent and also mobile node use the same cryptographic methods for their message security association.

Now that the message security associations are established between mobile node and home agent, optionally in step 61 there can be an immediate new registration protected by the created message security associations, in order to check whether the message security associations have been set up successfully on both sides.

By contrast with known negotiation methods such as the Security Mechanism Agreement Procedure of the Session Initiation Protocol SIP in RFC 3329 for example, in the method described herein it is neither necessary to resend the information about the cryptographic methods supported by the mobile node nor to resend the information about the cryptographic methods supported by the home agent, since the registration request and the registration reply were already authenticated and manipulation can therefore be excluded. The mutually-supported cryptographic methods are thus agreed with a total of only two messages, one from the mobile node to the home agent and one from the home agent to the mobile node.

Figure 2:
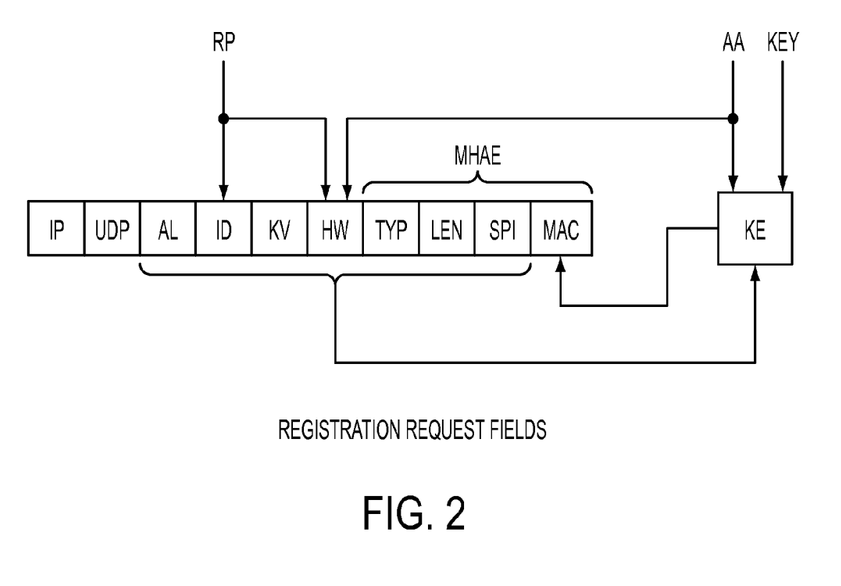
FIG. 2 is a data diagram providing an exemplary embodiment of the fields of a registration request.

FIG. 2 shows an exemplary embodiment for the fields of a registration request, as can be used for the method. The registration request has an IP header IP, a UDP header UDP and Mobile-IP fields. Contained in the IP header are the IP source address, the IP destination address and the IP lifetime. The UDP (User Datagram Protocol) header contains the source port and the destination port. The Mobile-IP fields include the fields AL and ID with a fixed length and an extension.

The field AL contains general information of the registration request, such as type, lifetime, IP address of the mobile node, IP address of the home agent and care-of address. Identifiers are contained in the ID field with which registration replies can be assigned to the associated registration requests and into which information for Replay Protection RP is also inserted.

The extension contains a Mobile Home Authentication Extension MHAE and the new fields KV, with the cryptographic methods supported by the mobile node, and HW, with the notifications about the cryptographic methods that will be used in order it to verify the authenticity of the current registration request.

The Mobile Home Authentication Extension MHAE contains the type TYP, the length LEN of the extension and the Security Parameters Index SPI, as well as the Message Authentication Code MAC. The Message Authentication Code MAC is computed in a cryptographic unit KE by the selected authentication algorithm AA and the symmetrical key KEY that is the only known to the mobile node and the home agent via the fields AL, ID, KV, HW, type, LEN and SPI. If even one of these fields is changed the recipient computes another message authentication code and can detect the manipulation by comparing this code with the transmitted message authentication code MAC. The registration request is transmitted in clear text so that the home agent can read the cryptographic methods KV supported by the mobile node and can read the notifications HW.

A registration reply for the method in accordance with the would be similar to the registration request shown in FIG. 2 and would likewise contain the new fields KV and HW.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for verifying authenticity of messages exchanged between a mobile node and a home agent in accordance with a mobile Internet Protocol, with a cryptographic method used for verifying the authenticity of the messages being agreed between the mobile node and the home agent, comprising:
   creating, by the mobile node, a registration request containing information on a plurality of cryptographic methods supported by the mobile node;
   providing authentication data related to a first cryptographic method used to protect the registration request, for verification by the home agent of authenticity of the registration request;
   sending the registration request including the authentication data, from the mobile node to the home agent;
   checking, by the home agent, authenticity of the registration request;
   if the home agent establishes the authenticity of the registration request, selecting, by the home agent, a second cryptographic method from the plurality of cryptographic methods indicated by the information contained in the registration request as a mutually supported cryptographic method for the mobile node and the home agent;
   registering, by the home agent, the mobile node and setting up at least one message security association between the mobile node and the home agent using the second cryptographic method; and
   sending a registration reply, from the home agent to the mobile node, indicating whether the registration of the mobile node is successful and notifying the mobile node about said selecting of the second mutually-supported cryptographic method if the home agent establishes the authenticity of the registration request.

2. The method as claimed in claim 1, further comprising sending a registration reply, from the home agent to the mobile node, rejecting the registration request if the home agent finds that the registration request is not authentic.

3. The method as claimed in claim 1, wherein the registration reply contains information about cryptographic methods supported by the home agent.

4. The method as claimed in claim 3, further comprising verifying the authenticity of the registration reply by the home agent using the second cryptographic method.

5. The method as claimed in claim 4, further comprising testing the authenticity of the registration reply by the mobile node.

6. The method as claimed in claim 1, further comprising, if the home agent can select at least one further mutually-supported cryptographic method between the home agent and the mobile node, selecting the first cryptographic method by the home agent as the at least one further mutually-supported cryptographic method.

7. The method as claimed in claim 6, further comprising:
   selecting, by the mobile node based on information in the registration reply, a third method mutually supported by the mobile node and the home agent, and
   setting up at least one message security association between the mobile node and the home agent by the mobile node using the third cryptographic method.

8. The method as claimed in claim 7, verifying, by the home agent, the authenticity of further message exchange between the mobile node and the home agent using the third cryptographic method mutually supported by the mobile node and the home agent.

9. The method as claimed in claim 8, wherein the first and the third cryptographic methods include message authentication codes and replay protection styles.

10. The method as claimed in claim 9, wherein at least one of the registration request and the registration reply is transmitted in plain text.

11. The method as claimed in claim 10, wherein at least one of the registration request and the registration reply contains a notification about at least one of the first and the third cryptographic methods, mutually supported by the mobile node and the home agent.

12. The method as claimed in claim 11, wherein the first cryptographic method is known from a preceding data exchange between the mobile node and the home agent.

13. The method as claimed in claim 12, wherein the mobile node and the home agent both have a common secret key.

14. A method for verifying authenticity of messages exchanged between a foreign agent and a home agent in accordance with a mobile Internet Protocol, with a cryptographic method used for verifying the authenticity of the messages being agreed between the foreign agent and the home agent, comprising:
   creating, by the foreign agent, a registration request containing information on a plurality of cryptographic methods supported by the foreign agent;
   providing authentication data related to a first cryptographic method used to protect the registration request, for verification by the home agent of authenticity of the registration request;
   sending the registration request including the authentication data, from the foreign agent to the home agent;
   checking, by the home agent, authenticity of the registration request;
   if the home agent establishes the authenticity of the registration request, selecting, by the home agent, a second cryptographic method from the plurality of cryptographic methods indicated by the information contained in the registration request as a mutually supported cryptographic method for the foreign agent and the home agent;
   registering, by the home agent, the foreign agent and setting up at least one message security association between the foreign agent and the home agent using the second cryptographic method; and
   sending a registration reply, from the home agent to the foreign agent, indicating whether the registration of the foreign agent is successful and notifying the foreign agent about said selecting of the second mutually-supported cryptographic method if the home agent establishes the authenticity of the registration request.

15. A method for verifying authenticity of messages exchanged between a mobile node and a foreign agent in accordance with a mobile Internet Protocol, with a cryptographic method used for verifying the authenticity of the messages being agreed between the mobile node and the foreign agent, comprising:
   creating, by the mobile node, a registration request containing information on a plurality of cryptographic methods supported by the mobile node;
   providing authentication data related to a first cryptographic method used to protect the registration request, for verification by the foreign agent of authenticity of the registration request;
   sending the registration request including the authentication data, from the mobile node to the foreign agent;
   checking, by the foreign agent, authenticity of the registration request;
   if the foreign agent establishes the authenticity of the registration request, selecting, by the foreign agent, a second cryptographic method from the plurality of cryptographic methods indicated by the information contained in the registration request as a mutually supported cryptographic method for the mobile node and the foreign agent;
   registering, by the foreign agent, the mobile node and setting up at least one message security association between the mobile node and the foreign agent using the second cryptographic method; and
   sending a registration reply, from the foreign agent to the mobile node, indicating whether the registration of the mobile node is successful and notifying the mobile node about said selecting of the second mutually-supported cryptographic method if the foreign agent establishes the authenticity of the registration request.

* * * * *